Aug. 12, 1952   C. D. JOHNSON ET AL   2,606,609
ADJUSTABLY TIMED CONTROL MECHANISM
Filed Nov. 18, 1949   3 Sheets-Sheet 1

Curtiss D. Johnson
Theodore R. Heyck
INVENTORS

BY Lester B. Clark
Ray L. Smith

ATTORNEYS

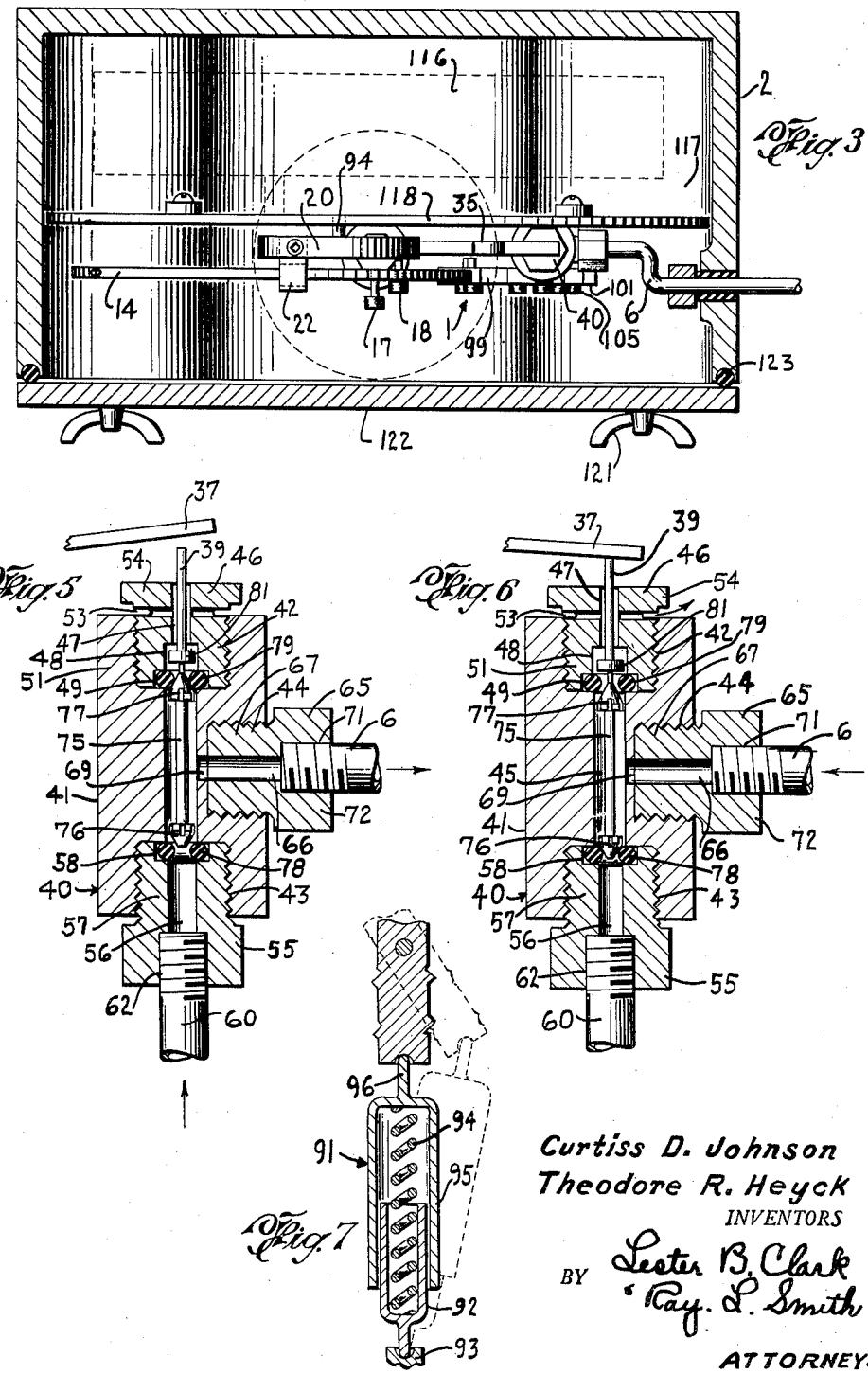

Aug. 12, 1952
C. D. JOHNSON ET AL
2,606,609
ADJUSTABLY TIMED CONTROL MECHANISM
Filed Nov. 18, 1949
3 Sheets-Sheet 3
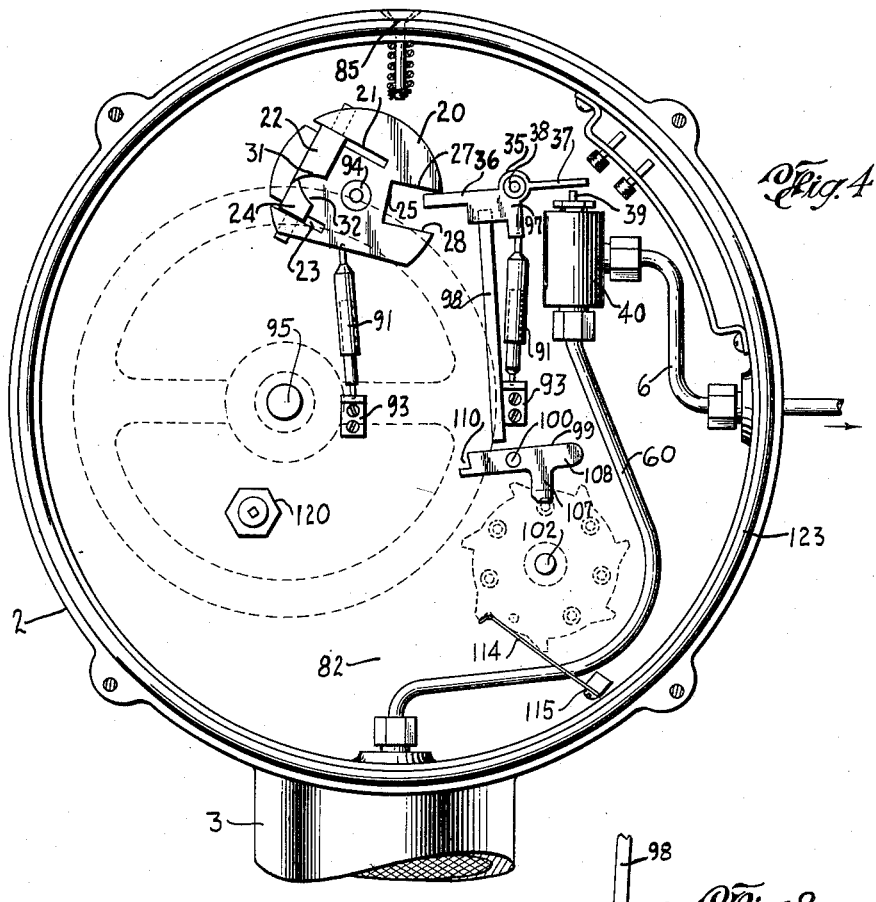
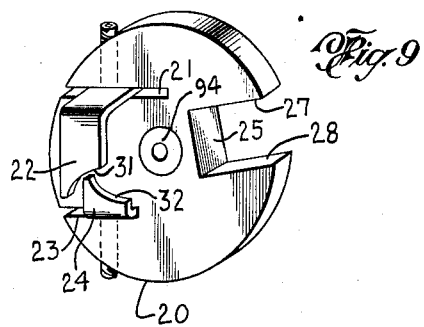
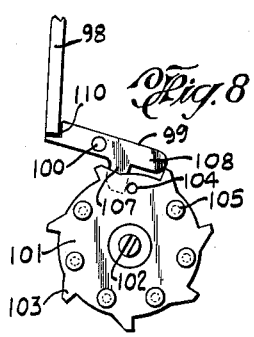
Curtiss D. Johnson
Theodore R. Heyck
INVENTORS
BY Lester B. Clark
Ray L. Smith
ATTORNEYS Patented Aug. 12, 1952

2,606,609

UNITED STATES PATENT OFFICE 2,606,609

ADJUSTABLY TIMED CONTROL MECHANISM

Curtiss D. Johnson and Theodore R. Heyck, Houston, Tex.

Application November 18, 1949, Serial No. 128,222

3 Claims. (Cl. 161—7)

This invention relates to an adjustably timed control mechanism which controls the flow of fluid through a pilot valve, and to an exterior source where the fluid performs an operation as the actuation, say, of a flow valve.

It is an object of this invention to provide a control mechanism of this class which may actuate a device exterior thereof during predetermined intervals during the day and which also may control the operation or non-operation of the exterior device according to these predetermined intervals during any desired days of the week or month.

It is a further object of this invention to provide a control mechanism of this class which is designed to abruptly open and close the pilot valve through which the fluid flows, thereby abruptly actuating the exterior device which the fluid controls.

It is a further object of this invention to provide a control mechanism equipped with a locking device to insure that the exterior device may not be actuated by the fluid on certain days, regardless of whether or not the means controlling the daily operating intervals may function.

It is yet another object of this invention to provide a control mechanism of this class which obtains the abrupt functioning of the pilot valve and of the exterior device actuated by the fluid through providing a snap action spring pivoted between a stationary bracket in the mechanism housing and a rotatable element of the valve control assembly.

It is yet a further object of this invention to provide a control mechanism of this class which has a pressurized housing to exclude therefrom the entry of noxious exterior gases which might enter the housing and adversely affect the working parts therein.

It is also an object of this invention to provide a pressurized housing of this class which is maintained at a predetermined pressure by the bleeding back of the fluid through the pilot valve and into the housing interior upon the actuation of the exterior device; a relief valve to the housing exterior being provided and set at a predetermined pressure and being operable when the bleeding back of the fluid into the housing increases the housing pressure above such predetermined setting.

It is yet another object of this invention to provide a pilot valve having a stem therein with two valve elements thereon, each adapted to seat on a flexible seat; one of such valve elements controlling the passage of fluid through the valve and the other of such valve elements controlling the bleeding of fluid into the mechanism housing.

It is still another object of this invention to provide a control mechanism of this class which has a flexible adjustable seal ring between the body and the cover of the housing.

It is yet another object of this invention to provide a control mechanism of this class which has means for regulating the starting and stopping of fluid flow through the pilot valve during a large number of preseleced daily time intervals.

It is still a further object of this invention to provide a control mechanism of this class which has means for discontinuing the operation of the device on a preselected day or number of days.

It is also a further object of this invention to provide a control mechanism of this class in which a switch is opened and closed by the control so as to actuate a solenoid exterior to the mechanism, the solenoid, in turn, actuating a device, as a flow valve.

It is yet a further object of this invention to provide a mechanism of this class which has a control equipped with means, as springs, to impart snap action to the operation of the control.

Other and further objects of this invention will be apparent when the specification is considered in connection with the drawings, in which:

Fig. 3 is a plan view of the mechanism taken along line 3—3 of Fig. 2;

Fig. 4 is an elevation of the mechanism with the day dial and week disc removed and shown in phantom;

Fig. 5 is a sectional elevation through the pilot valve of the mechanism showing the pilot valve in open position;

Fig. 6 is a sectional elevation through the pilot valve of the mechanism showing the pilot valve in closed position;

Fig. 7 is a sectional elevation through the spring by which the snap action operation of the pilot valve is obtained;

Fig. 8 is an elevation showing the operation of the week disc and locking means;

Fig. 9 is a perspective view showing the construction of the disc operated by the day dial to control the valve actuating means.

Figure 1:
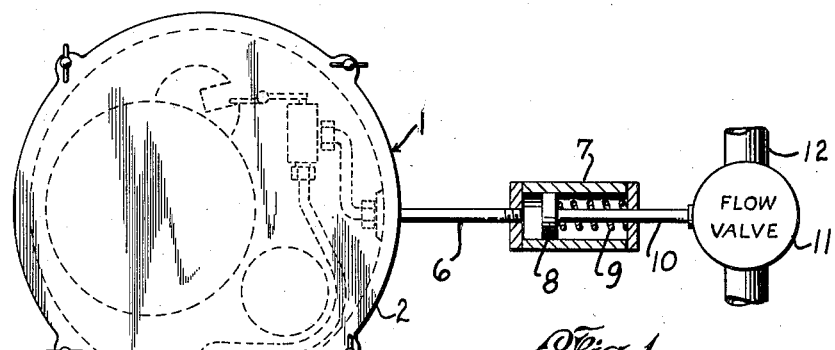
Figure 1 is an elevation, part in section, showing the mechanism in combination with a source of compressed air and with the device which the mechanism operates.

As shown in Fig. 1, the frame or housing 2 of the control mechanism 1 has connected thereto a strainer 3 which strains a fluid as compressed air or gas, which passes from a source 4 through the strainer and into the housing. A gauge 5 is provided, and connected to the strainer 3, to record the pressure of the fluid. The fluid, which is controlled by the mechanism 1, passes out of the housing 2 through the line 6, which carries it to a point where it actuates a device or does work of some kind. In this particular case, it is shown entering the cylinder 7 to actuate the piston 8 against the spring pressure 9 so that the rod 10 of the piston may open and close the flow valve 11. This flow valve 11, in turn, opens or closes the line 12 through which it may be desired to flow a fluid at intervals. Typical of this application would be the connection of the apparatus in Fig. 1 to flow oil from an oil well at desired intervals.

Figure 2:
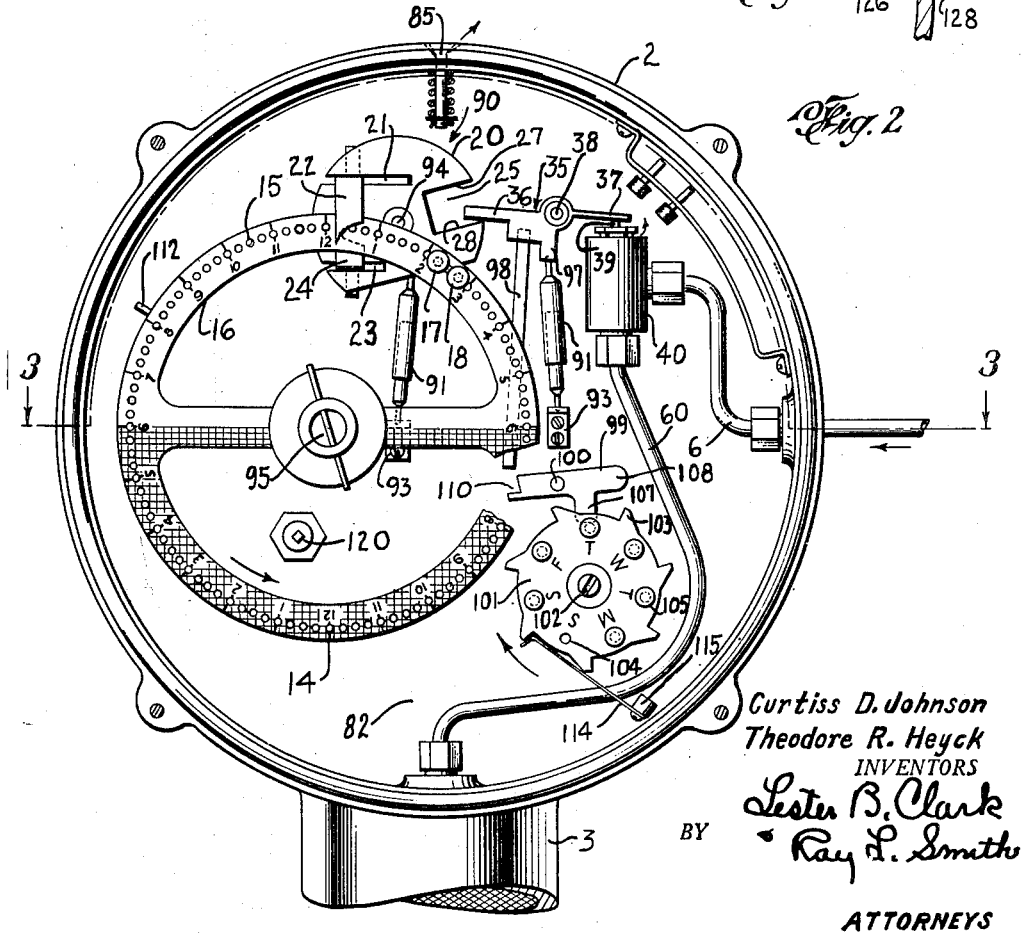
Fig. 2 is an elevation of the mechanism with the cover removed.

Within the housing 2 a dial 14 is rotatably mounted. This dial is driven by a time clock, or motor, not shown, or by any other device which is geared to rotate the dial 14 in correlation with the passage of time. This dial 14 has holes 15 therein circumferentially spaced around the rim 16 thereof; and, as shown in Fig. 2, these holes are spaced to divide the dial into fifteen-minute intervals, in which case the time clock or motor rotates the dial one complete revolution every twenty-four hours. As shown in Fig. 3, pins 17 are insertable in the holes 15 to extend toward the face of the housing 2; and other pins 18 are insertable so that the stem of the pin extends through the dial 14 toward the rear of the housing 2.

A disc 20 is rotatably mounted within the housing in spaced relationship to the dial 14, as shown in Fig. 2. This disc 20 has a slot 21 therein, in which is positioned a cam 22; and it also has the slot 23 therein, in which is positioned the cam 24. Opposite the cam side of the disc, the slot 25 is provided, which has the side faces 27 and 28, to serve as will be hereinafter described. The cam 22 extends further toward the face of the housing 2 than does the cam 24. With the dial 14 rotating counterclockwise, as shown in Fig. 1, the pin 17 will contact the surface 31 of the cam 22, shown most clearly in Fig. 9, and cause the disc 20 to rotate in a clockwise direction. On the other hand, the cam 24 is positioned close to the face of the disc 20 and on the inner side of the dial 14 from the cam 22, and this pin 18 follows the pin 17 to contact the surface 32 of the cam 24 to rotate the disc counterclockwise.

A lever 35 is pivotally mounted within the housing in spaced relation to the disc 20 so that the slot surfaces 27 and 28 may contact the arm 36 of the lever. The axle 38 of the lever 35 therefore acts as a fulcrum to permit the arm 37 to move in contact with, and away from, the stem end 39 of the pilot valve 40 which is mounted within the housing adjacent the lever 35.

The pilot valve 40 has a body 41 having threaded bores 42 and 43 in opposed ends thereof, and a threaded bore 44 centrally thereof and perpendicular to the axis of the bores 42 and 43. A central bore 45 extends through the body 41 coaxial with the bores 42 and 43. A plug 46 has a central bore 47 therethrough, and has two concentric counterbores 48 and 49 in the threaded end 51 thereof, which end threads into the threaded bore 42. Radially extending bleed holes 53 place the bore 47 within communication with the periphery of the plug 46 just under the plug cap 54.

The plug 55 has a bore 56 therethrough, and a counterbore 58 in the threaded end 57 which is threaded into the bore 43. The cap 61 of the plug 55 has a threaded counterbore 62 into which is threaded the compressed air line 60.

The plug 65 has the bore 66 therethrough and a threaded end 67 which is threaded into the threaded bore 44. A bore 69 in the body 41, coaxial with the bore 66, places this bore in communication with the bore 45 through the body 41. The plug 65 also has a threaded counterbore 71 in its cap 72, into which is connected the compressed fluid line 6.

A valve stem 75 is provided, which has the valve element 76 at an end thereof to seat in the flexible ring 78 forming a valve seat in the counterbore 58 of the plug 55. Approximately centrally of the valve stem 75 another valve element 77 is provided, which seats against the flexible seal 79, forming a valve seat in the counterbore 49 of the plug 46. The stem 75 also has the stop 81 thereon to seat in the counterbore 48 to limit the upward travel of the stem. Above this stop 81 the end 39 of the stem 75 extends through the bore 47 and above the cap 54.

As shown in Fig. 5, the arm 37 of the lever 35 is out of contact with the stem end 39 so that compressed air may unseat the valve element 76 and pass upwardly through the bore 45 and out through the bore 69 and the bore 66 and into the line 6. This lifting action of the compressed air or fluid also forces the valve element 77 upwardly into sealing contact with the seal ring 79 in the counterbore 49 of the plug 42 and closes off any passage of compressed fluid into the housing interior 82. The fluid thus passes into the pilot valve 40 through the line 60 and out therefrom through the line 6, and actuates a device exterior to the housing, as the flow valve 11, shown in Fig. 1.

It can thus be said that the portion of the bore 45 below the valve element 77, and the port including the bores 69 and 66, together correspond to the flow passage of a conventional valve.

When the arm 37 moves downwardly, as shown in Fig. 6, it presses against the end 39 of the stem 75 and forces the valve element 76 against the seal ring 78 to shut off the upward passage of the fluid as compressed air, from the line 60. This also moves the valve element 77 downward out of contact with the seal ring 79 so that fluid in the line 6 may pass back through the bores 66 and 69 into the bore 45 and upwardly around the valve element 77 into the bore 47 of the cap 46 and out through the bleed holes 53 into the valve interior 82.

The housing interior 82 is originally put under a predetermined pressure in excess of the pressure surrounding the housing 2 so as to avoid the entrance of any exterior gases into the housing. This feature has a special adaptability in territories where "sour" gases, having a high sulphur content therein, exist around the top of an oil well. These gases have a very corrosive and deleterious effect upon any kind of working parts; and if they were permitted to permeate into or leak into the inside of the housing 2, the operation of the fine parts of the control mechanism 1 would be seriously hampered.

A relief valve 85 is provided within the housing 2, and this is set by conventional adjustment means to lift only when the predetermined pressure within the pressurized housing 2 is exceeded. It can thus be seen that the return of fluid, as air or gas, into the housing when the valve is closed, as shown in Fig. 6, will maintain the pressure within the housing 82 at its predetermined value, whereas the relief valve 85 will permit any of the excess which has thus bled back into the housing, to escape to the outer atmosphere.

To insure a quick opening and closing action of the pilot valve 40, the disc 20, which acts as an actuating or operating means for the lever 35, and also the lever 35 itself, which acts as the valve actuating or operating means, are both provided with snap action devices. In effect, the disc 20 and the lever 35, including their snap action means, may both be regarded as constituting a subassembly 90, which is the control for the valve 40.

To provide this snap action for the lever 35 and disc 20, spring assemblies 91 are provided, each of which has a lower spring housing 92 pivotally mounted on a bracket 93 within the housing 2. A spring 94, as shown in Fig. 7, has its lower bearing in the lower spring housing 92, while the upper spring housing 95 serves as its upper bearing. This upper spring housing extends around the lower spring housing 92, and is provided with a pivot end 96 to pivotally bear within the arm 97 of the lever 35 or within the disc 20, as shown in Fig. 4.

The bracket 93 for the snap action spring assembly 91 for the disc 20, is mounted in a certain spaced relationship with regard to the disc center 94 and the dial center 95. This arrangement insures that after the starting pin 17 contacts the surface 31 of the starting cam 22 and the disc 20 is rotated beyond a dead center position with respect to the spring assembly 91, the force of the spring 94 will suddenly snap the disc 20 around in a clockwise position so that the surface 27 thereof bears down abruptly against the arm 36 of the lever 35, with the result that the arm 37 is pivoted abruptly upwardly and out of contact with the valve stem end 39.

Conversely, the stop pin 18 follows around to contact the stop cam surface 32 to rotate the disc 20 counterclockwise beyond a dead center position with respect to the spring assembly 91, whereupon the force of the spring 94 suddenly snaps the disc in a further counterclockwise direction so that the surface 28 abruptly contacts the lever arm 36 to pivot the arm 37 abruptly downwardly to contact the valve stem end 39 to close off the flow passage through the valve.

A stop rod 98 is rigidly connected to the lever 35 and extends therebelow and normally rides out of contact with the stop cam 99. This stop cam 99 is pivoted at 100, and the week disc 101 adjacent thereto is pivoted at 102 in spaced relationship with the pivot 100 and with the dial center 95. The week disc 101 has seven points 103 thereon, and seven holes 104 therein, and these correspond to the days of the week. Pins 105 may be inserted in the holes 104, as desired, and these pins are so spaced that in rotation one after another they bear upon the arm 107 of the week stop cam 99 and hold it in the position shown in Fig. 2.

However, whenever a pin 105 is omitted from the hole 104, the stop cam 99, which is weighted at the end 108 thereof, will pivot downwardly in a clockwise direction, as shown in Fig. 8, since there is no pin to hold up the arm 107. When this occurs, the notch 110 in the week stop cam 99 engages the stop rod 98, and this locks the lever 35 in the position shown in Fig. 2. In this locked position the arm 36 of the lever 35 does not respond to upward movement by the disc surface 28 or downward movement by the disc surface 27, regardless of whether the starting pins 17 move over the surface 31 of the starting cam 22 or whether the stop pins 18 move over the surface 32 of the stop cam 24. In this locked condition, as the arm 36 can not be moved, any force of the disc against it is counteracted by motion of the springs 94, either in contraction or expansion.

To insure that the week disc 101 moves a space representative of a day thereon, the day change pin 112 is provided in the rim 16 of the dial 14, and this pin contacts a tooth 103 on the disc 101 once every revolution of the dial 14 and moves it one-seventh of a revolution of the disc 101. The spring 114 is mounted within the housing at 115, and bears against the disc 101 to prevent backlash.

As hereinabove stated, the time clock or motor which actuates the dial 14 is not shown, but the location 116 therefor is indicated in Fig. 3, which shows it in the rear part 117 of the housing 2 and between the plate 118 on which the dial 14, disc 20, lever 35, pilot valve 40, brackets 93, stop cam 99, and week disc 101 are mounted. The stem 120 of a time clock is shown in Figures 2 and 4 to indicate how the clock may be wound. Access to the mechanism, or to wind the stem 120, is obtained by turning the wing nuts 121 on screws, not shown, to remove the cover 122, which is normaly held thereon by the wing nuts against the O-ring seal 123.

Figure 10:
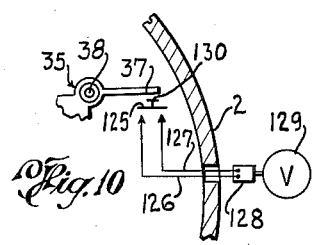
Fig. 10 is a diagrammatic view showing a modification in which an electric switch is operated by the control of the mechanism so as to actuate a solenoid to open and close a flow valve.

A modified form of this invention, as shown in Fig. 10, considers substituting a contactor switch 125 for the pilot valve 40. In this case the insulated leads 126 and 127 pass through the housing 2 to a solenoid 128 which controls a valve 129. The arm 37 of the lever 35 in this case controls the opening and closing of the switch 125 as it is moved down against, or is drawn away from, the switch button 130. Such a modification has an application in instances where it may not be feasible to employ a fluid, as compressed air or gas.

A particularly novel feature of this invention resides in the great flexibility it affords as regards adjustability of the time factor. Pins 17 and 18 may be spaced upon the dial 14 to set the device to operate a plurality of times and for varied time lengths during a revolution of the dial. The disc 101, when employed with the dial 14, permits any cycle set upon the dial 14 to be repeated either successively or intermittently each revolution of the dial 14. The addition of a pin or pins to the rim of the dial 14 enables the dial to actuate the disc 101 a varied number of times per revolution, and the points on the disc 101 may be varied in number in construction to further increase the flexibility of time control.

This invention is especially adapted to control a flow valve such as the type of valve used to control the intermittent flow through fluid lines under pressure. It is thus especially adapted to control the valve which permits oil wells to flow at certain intervals. In the flow valves used for this purpose, it is necessary to quickly close, and to quickly open, such a valve, as otherwise the formation substances carried along with the oil will abrade or wear away the operating parts of a slow opening or slow closing valve. Additionally, such substances are likely to cause clogging in such slow functioning valves.

It is also pointed out that the specific pilot valve construction herein disclosed is not a limitation of this invention, but other structures are considered, as that shown in Fig. 10, or any other structure which may actuate any medium through which it is designed to control the operation of an exterior device. The invention also goes beyond the flow valve diagrammatically disclosed and considers the operation of any exterior structure which is operable to start and stop a cycle of flow or motion.

In addition to controlling the flow of fluid, as oil, from a well, this invention may be employed after the fashion of a conventional intermitter, to control the admission of a fluid, as gas under pressure, into a well to cause the well fluid to flow.

It is additionally pointed out that this invention is not limited to apparatus within a housing, or to apparatus for turning on a flow valve. The structure may be employed for other functions as well, and installed in locations other than at oil wells. For instance, either the pilot valve or the electromagnetic means may be employed to actuate an electric motor or to ring an audible signal, as a bell, or to operate a visual signal, or for any number of diverse purposes.

Broadly, this invention considers an adjustably timed control mechanism, operable to actuate a device exterior thereof, the operation of the control permitting adjustability of operation over a single cycle, and also adjustability of operation over a longer cycle which is a multiple of the single cycle in point of time.

What is claimed is:

1. An adjustably timed control mechanism comprising, a housing under a predetermined pressure having pressure relief means in the wall thereof and a valve therein for controlling a flow passage therethrough, a fluid responsive device actuated by the pressure of fluid flowing through said flow passage, communication means in said valve between said flow passage and said housing, a control in said housing, a revolved dial in said housing having means at circumferentially spaced distances apart to actuate said control to open said valve to permit fluid to flow through said passage to said device and then to close said valve after said valve remains open while the dial rotates the circumferential distance between said means in said dial, the closing of said flow passage by said valve employing said communicating means to permit fluid from said device to bleed through said valve into said housing to lift said relief means when the housing pressure exceeds said predetermined pressure.

2. For employment in a housing having an enclosed flow passage therethrough and a valve therein to control said flow passage, the combination of, a control mounted adjacent said valve and adapted upon actuation to open and close said valve, a revolved dial mounted therein to be rotated into contact with said control to actuate said control to open said valve and then close said valve after a predetermined time interval, a disc rotatably mounted in said housing adjacent said dial and having angularly spaced apart teeth therein, a contactor on said dial to contact one of said teeth each revolution of said dial to rotate said disc in a direction opposite to the direction of dial rotation, and for the angular distance between teeth, a locking means mounted in said housing between said control and said disc, means insertable in said disc at spaced angular distances to render said locking means ineffective, said locking means being operable, to lock said control in valve closing position upon said disc being rotated to bring said locking means out of contact with said insertable means and into a space area from which an insertable means has been omitted.

3. For employment in a housing having an enclosed flow passage therethrough and a valve therein to control said passage, the combination of, a cam disc pivotally mounted in said housing and having a radial slot therein, a lever pivotally mounted in said housing and having a first arm to extend within said slot and the other arm positionable to close said valve, resilient means pivoted at one end in said lever and at the other end in said housing, a revolved dial mounted in said housing and having successive means insertable therein in circumferentially spaced apart relation, a first and a second cam surface on said cam so disposed that a leading insertable means on said dial will contact said first cam surface to rotate said cam disc so that the surface on one side of said slot will contact said first arm to pivot said lever in valve opening direction, and so that upon continued rotation of said dial a following insertable means will contact said second surface to rotate said disc cam in the opposite direction and to bring the opposite surface of said slot against said first arm to pivot said lever to bring said second arm into valve closing contact, said resilient means being so mounted as to operate as a toggle to accelerate the pivoting of said lever to valve open or valve closed positions.

CURTISS D. JOHNSON.
THEODORE R. HEYCK.

REFERENCES CITED

The following references are of record in the file of this patent:

UNITED STATES PATENTS

| Number | Name | Date |
|---|---|---|
| 1,300,982 | Lodge | Apr. 15, 1919 |
| 1,828,126 | Brown | Oct. 20, 1931 |
| 1,952,171 | Jones | Mar. 27, 1934 |
| 2,025,511 | Johnson | Dec. 24, 1935 |
| 2,030,451 | Kerr et al. | Feb. 11, 1936 |
| 2,048,607 | Griffey | July 21, 1936 |
| 2,053,110 | Regan | Sept. 1, 1936 |
| 2,106,094 | Griffey et al. | Jan. 18, 1938 |
| 2,143,974 | Chapman | Jan. 17, 1939 |
| 2,185,394 | Arbogast | Jan. 2, 1940 |
| 2,204,532 | Erbguth et al. | June 11, 1940 |
| 2,236,298 | Reid | Mar. 25, 1941 |
| 2,250,979 | Winborne | July 29, 1941 |